United States Patent [19]
Glerum et al.

[11] Patent Number: 4,693,658
[45] Date of Patent: Sep. 15, 1987

[54] METHOD OF MANUFACTURING A CONTAINER BODY HAVING A TEAR STRIP, THE BODY PER SE, AND A METAL BLANK FROM WHICH THE BODY IS TO BE MANUFACTURED

[75] Inventors: Johannes A. Glerum, Am Deventer; Robert C. Klunder, Aw Twello, both of Netherlands

[73] Assignee: Thomassen & Drijver-Verblifa NV, De venter, Netherlands

[21] Appl. No.: 746,127

[22] Filed: Jun. 18, 1985

[51] Int. Cl.$^4$ .................... B21D 51/26; B23K 11/06; B65D 17/36
[52] U.S. Cl. .................... 413/1; 413/7; 413/77; 220/75; 220/266; 220/270; 220/274; 219/64; 228/191
[58] Field of Search .................. 413/1, 7, 77; 220/266, 220/270, 274, 75, 76; 219/64, 82; 228/187, 191

[56] References Cited

U.S. PATENT DOCUMENTS

| 1,954,840 | 4/1934 | Young | 220/75 |
| 3,077,171 | 2/1963 | Gotsch et al. | 413/1 |
| 3,618,817 | 11/1971 | Troughton | 413/1 |
| 3,838,787 | 10/1974 | McCloskey | 220/75 |

FOREIGN PATENT DOCUMENTS 0038646 10/1981 European Pat. Off.
2003406 3/1979 United Kingdom.

Primary Examiner—Frederick R. Schmidt
Assistant Examiner—William E. Terrell
Attorney, Agent, or Firm—Charles E. Brown

[57] ABSTRACT

The disclosure relates to a method of manufacturing a body formed of a shaped sheet metal blank having an opening tear strip terminating in a tongue. Overlapping edges of the blank are welded together and at the tear strip melting of a tin coating of the blank occurs so that at the tear strip the edges of the blank are linked by melted tin, or welding is completely interrupted to form a slot at the tear strip between the overlapping edges of the blank and the slot using a sealing material. Further, the disclosure relates to a metal blank for a can body having a tear strip formed there across by two weakening scores extending transversely to the edges of the blank and terminating in a tongue. The tear strip at one of the edges of the blank is provided with a covering and/or oxide layer which has a relatively low electrical conductivity.

7 Claims, 14 Drawing Figures

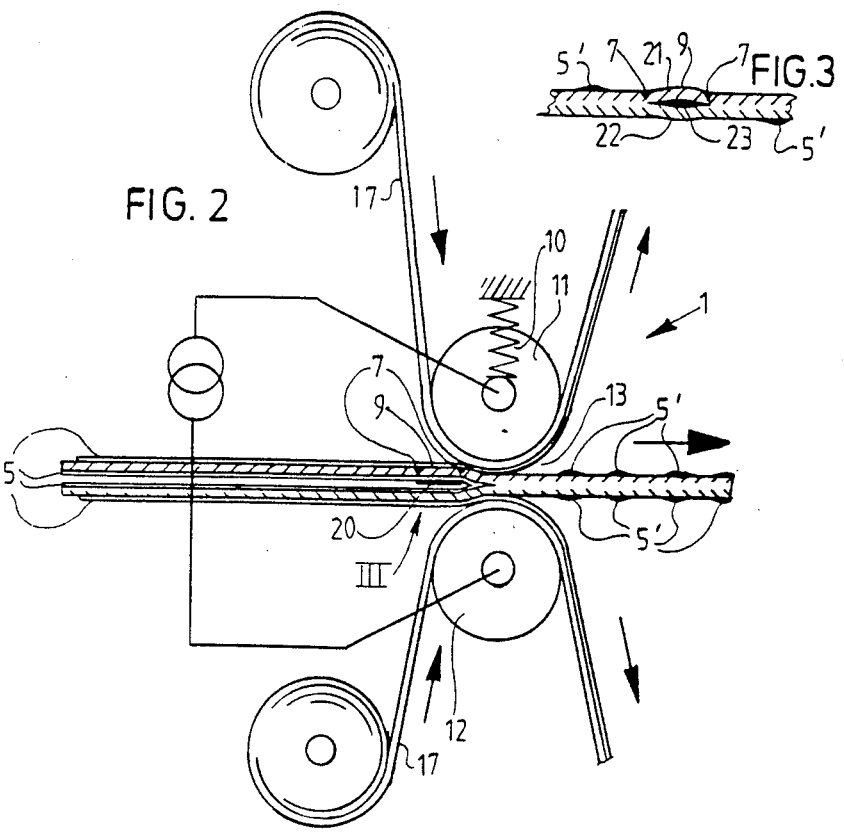
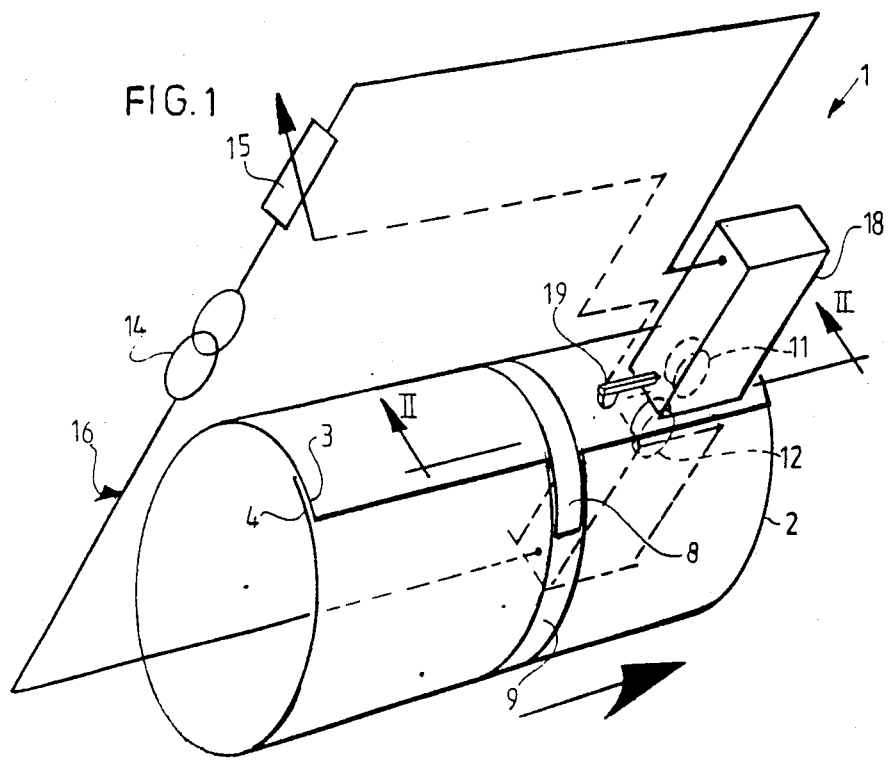

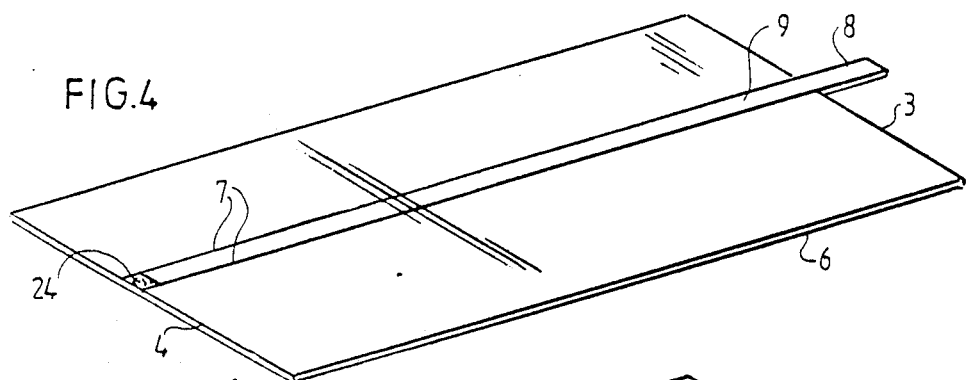
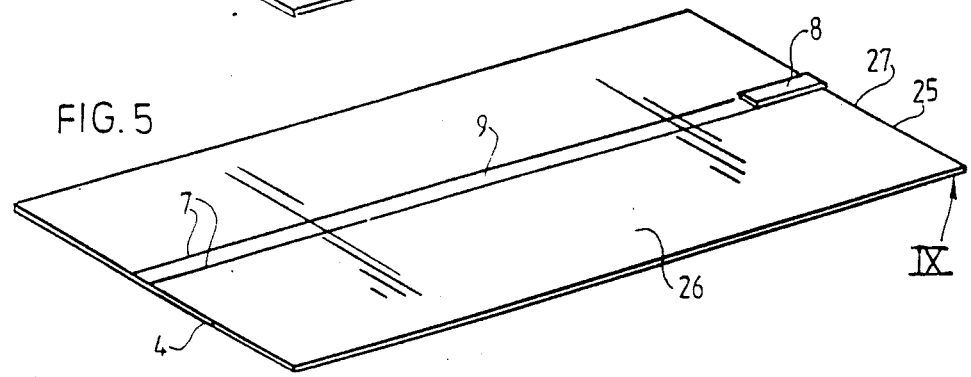
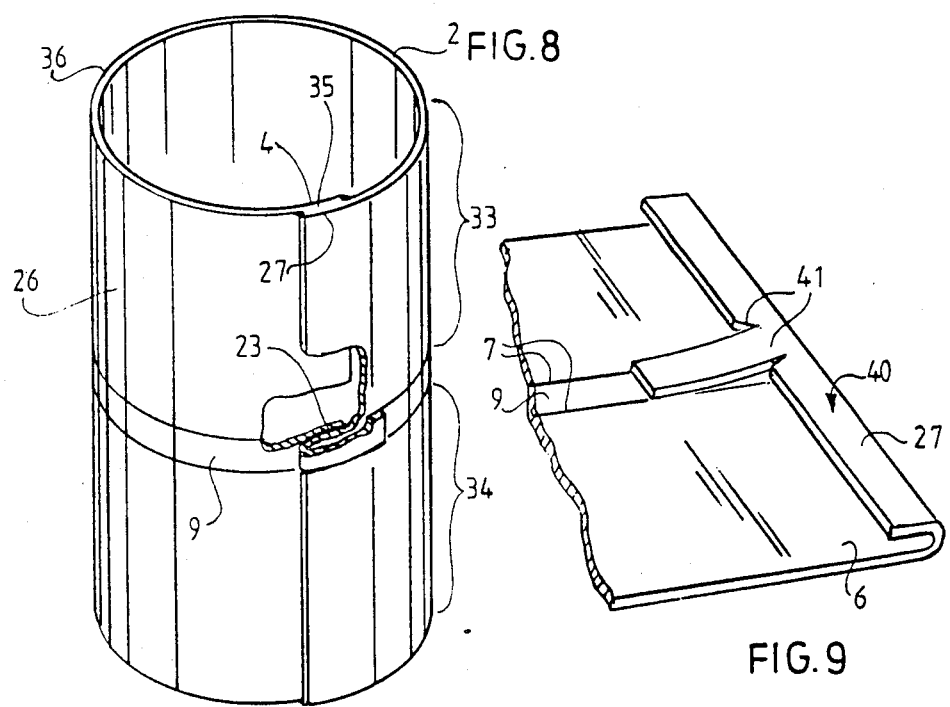

METHOD OF MANUFACTURING A CONTAINER BODY HAVING A TEAR STRIP, THE BODY PER SE, AND A METAL BLANK FROM WHICH THE BODY IS TO BE MANUFACTURED

The present invention relates to a method of manufacturing a container body in which a shaped metal blank having an opening tear strip terminating in a tongue, has overlapping edges which are welded together.

Such a body having a tear strip terminating in a tongue, can be used in making, for instance, tripartite preservation cans. The broadly used resistance welding process has on the one hand the disadvantage, that when welding across the tear strip the overlapping edges in the welding of the body such a strong link is formed, that it is difficult to open the resultant can along the opening tear strip using any suitable gear. On the other hand often rather sharp structures are formed after removing the opening tear strip, because the weakening scores defining the opening tear strip have almost completely disappeared after welding of the side seam.

A known method consists of applying additional welding material on the overlapping edges at the tear strip. The required additional installation for adding additional welding material, has in the known method the disadvantage that the quantity of welding material to be added will be different from one body to the next.

The invention has for its object to improve the method mentioned, that at the crossing of the opening tear strip with the overlapping edges a hermetical sealing is formed, but the opening tear strip can easily be torn from adjacent portions of the body. According to the method of the invention at the opening tear strip the welding intensity is decreased to one such that either solely tin-melting occurs so that at the opening tear strip the edges are linked by melted tin, or welding is interrupted with the result a slot is formed at the opening tear strip between the overlapping edges and thereafter the slot is covered using a sealing material.

In various ways the welding intensity can be reduced at the opening tear strip: first at the opening tear strip the welding intensity is decreased by reducing at the opening tear strip the current intensity of the current passing through the overlapping edges, and secondly the welding intensity is decreased by increasing at the opening tear strip the electrical resistance.

Increasing the electrical resistance at the opening tear strip can be effected either by providing at the opening tear strip at at least one of the overlapping edges of the shaped metal blank with a covering layer and/or oxide layer which has a relatively small electrical conductivity, or by increasing at the opening tear strip the thickness of the metal, which preferably is realized by folding the tongue protruding from an edge of the blank backwardly prior to welding. An attendant advantage of folding backwardly the tongue is that both overlapping edges are generally straight, so that such a metal plate can be welded using an automatically operating welding apparatus provided with a Z-like guiding element (a so called Z-bar).

Another aspect of this embodiment of the invention relates to a sheet metal blank having an opening tear strip formed by two weakening scores extending transverse to its edges and terminating in a tongue, which blank is characterized either in that at the opening tear strip one of the edges is provided with a covering layer and/or oxide layer which has a relatively smaller electrical conductivity, or by a backwardly folded tongue.

A last aspect of this embodiment of the invention relates to a body manufactured according to the method of the invention, which body is characterized by a link formed by melted tin and extending at the opening tear strip between the overlapping body edges, the tin originating from the tin coating of the sheet metal blank.

With respect to the second embodiment of the invention it appears surprisingly, that if over a small part of the height of the body the overlapping edges are not welded together, this does not lead to a total weakening of the side seam, and that it is sufficient for obtaining a hermetic sealing, that the slot formed by interrupting the welding operation is sealed.

Although any suitable sealing material can be used, it is advantageous to use as sealing material a lacquer with which welded side seams of known bodies, formed by welding, are lacquered or covered. Thereto it is advantageous, that the sealing material is applied along the welded side seam.

If the sealing material is applied on the interior surface of the body, then the contents to be contained in the body cannot come into contact with the metal of the raw edges, as to prevent any undesired effects.

The slot can be sealed in a simple way, if the sealing material is a thermoplastic material, in which preferably a powderous material is applied, which subsequently is melted using heat. If prior to welding the tongue protruding from the blank edge is folded backwardly, the advantage is obtained, that both overlapping edges are generally straight, so that such a metal plate can be welded using an automatic welding apparatus, having a leading element in Z-form (a so called Z-bar). In order to obtain a welding operation which is as even as possible, it is preferred, that both the tongue and the adjacent edge of the blank are folded backwardly.

Another aspect of the second embodiment according to the invention relates to a body formed out of a shaped sheet metal blank having an opening tear strip terminating in a tongue and of which overlapping edges are welded together, characterized by a slot extending across the tear strip between the overlapping edges.

With respect to this second embodiment the invention further relates to a sheet metal blank from which the body is formed, and to a container formed with such a body.

Cited and other characteristics will be illustrated in a number of not limiting examples of both embodiments referring to the annexed drawing.

IN THE DRAWING

FIG. 1 is a schematic perspective view showing a welding process according to the invention for the manufacturing of a body;

FIG. 2 is a schematic longitudinal sectional view taken along the line II—II of FIG. 1;

FIG. 3 is a sectional view showing the welded seam on a larger scale detail III of FIG. 2;

FIGS. 4 and 5 are both perspective views of a sheet metal blank appropriate for forming a body, the blank according to FIG. 4 being provided with a layer of low electrical current conductivity, and the blank according to FIG. 5 having the tongue folded backwardly;

FIG. 8 is a perspective view with parts broken away and shown in section of a welded body manufactured from the sheet metal blank of FIG. 5;

FIG. 9 is a fragmentary pespective view showing a variant of detail IX of FIG. 5;

Figure 6:
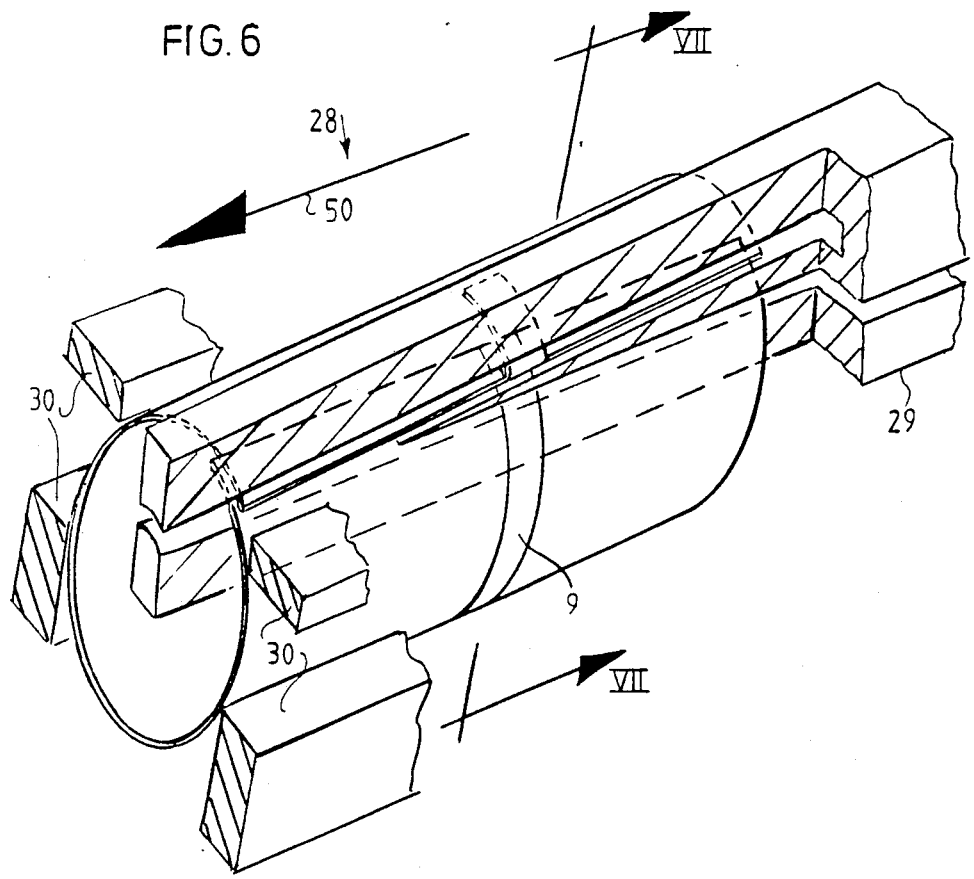
FIG. 6 is a schematic perspective view with parts broken away and shown in section of a method for manufacturing a body in which use is made of a Z-bar.

In FIG. 1 there is illustrated an apparatus 1 for manufacturing a container body 2 by thermal welding of overlapping edges 3 and 4 of a shaped sheet metal blank 6 which is provided with an opening tear strip 9 defined by weakening scores 7 formed transversely of edges 3, 4 in the metal blank and terminating in a projecting tongue 8.

The apparatus 1 comprises two cooperative welding electrode rolls 11, 12 which are forced towards one another under the action of spring means 10, the rolls define a nip 13 through which the overlapping edges 3, 4 of the body are passed. While the body 2 is moving between the rolls 11 and 12, an electric current is passed through the roll 11, the overlapping edges 3 and 4 and the roll 12, through the rolls 11 and 12 being incorporated in a current circuit further including a transformer 14 and an adjustable resistor 15. Under the influence of heat generated in the part of the metal passed between the rolls 11 and 12, the base metal melts and the edges 3 and 4 are fused, and tin originating from a tin coating 5 on the base metal is taken up by copper electrode wires 17 and disposed, whereas only thin residues 5' of tin remain on the metal of the resultant welded side seam.

A unit 18 carrying the roll 11 comprises a finger or feeler 19 which is used to determine the position of the tear strip 9 with respect to the nip 13. A signal delivered by the feeler 19 can be used to control the adjustable resistor 15 so, that when the tear strip 9 passes through the nip 13 the current intensity in the current circuit 16 is decreased. This means, that the heat generated in the overlapping edges 3 and 4 is greatly decreased, so that at the tear strip 9 the base metal of the overlapping edges 3 and 4 does not fuse, and solely a melting of the tin present occurs. This results in a weakened but hermetically closed link between the overlapping edges 3 and 4 at the tear strip 9, and this link can easily be broken if through a device (not shown) mounted on the tongue 8 a force is exerted in a direction away from the body 2.

If, as shown in FIG. 2 at the tear strip 9 the overlapping edges 3 and 4 are provided with a coating 20 of a material which is a poor conductor of electric current, the feeler 19 and the adjustable resistor 15 can be omitted, because with a constant voltage drop between the rolls 11 and 12 the current passing through the body 2 at the tear strip 9 will decrease due to the increased electrical resistance obtained with the coating 20.

In FIG. 3 there is shown in more detail a welded seam obtained at the tear strip 9. It is noted, that on both sides of the tongue 8 both edges 3 and 4 are fused and the tin coating originally present there and between is forced away. At the tear strip 9 there occurs solely a tin fusion, so that the original part 21 of the overlapping edge 3 and the corresponding part 22 of the edge 4 remain present and are separated by a quantity of fused tin 23. It will be seen that although the body 2 is passed through the nip 13 the weakening scores originally present retain generally their original form due to lack of melting of the base metal. The numeral 5' indicates the residual parts of the tin coating.

In FIG. 4 there is illustrated the sheet metal blank 6 on which at that end of the tear strip 9 on the edge 4 a layer 24 of a material which is a poor conductor of electric current, is applied. This layer 24 could comprise a covering layer and/or an oxide layer obtained by a chemical treatment of this surface, for instance a treatment using phosphate or chromate.

In FIG. 5 there is illustrated a similar sheet metal blank 25, in which the tongue 8 is bent or folded backwardly and lies along the surface 26 in overlying relation to a part of the tear strip 9, eventually forming the exterior surface of the welded body. Bending or folding the tongue 8 backwardly creates on the one hand along the edge 27 at the tear strip 9 a greater material thickness, which results in a higher electric resistance, and on the other hand to an even undisturbed edge 27. Accordingly, the mutual overlapping edges 27 and 4 are straight and uninterrupted and can be used for the adjustment of the width of edge overlapping.

In FIG. 6 there is schematically illustrated an automatic welding apparatus 28 comprising a guide element 29 having generally the cross section of the letter "Z". As shown more in detail in FIG. 7, external guide members 30 push the edge 27 of the body blank against a guiding wall 31 and the edge 4 against a guiding wall 32 of the Z-bar guide element 29 whereas the angle α (FIG. 7) in the direction of the arrow 50 (FIG. 6) decreases. Between the guiding walls 31 and 32 the overlapping width between the edge 27 and the edge 4 can be adjusted accurately. This width is in the range of about 0.1-4 mm.

Since the tongue 8 is folded backwardly and lies on the surface 26 there is a greater material thickness at the tear strip 9, resulting, with a constant voltage supply, in a lower current transmission through the material than between the rolls 11 and 12 with a lower resultant temperature where solely a melting of the tin occurs, and this melted tin forms a hermetic link or seal between the edge 27 and the edge 4 at the tear strip 9. Since the tongue 8, folded backwardly, automatically results in a local current reduction, means for locating the position of the tongue 8 relative to the rolls 11 and 12 can be omitted.

In FIG. 8 there is shown a body manufactured from the blank 25. It is to be noted that the parts 33 and 34 of the welded side seam 35 consist of fused portions of the edges 4 and 27 which generally did not include tin. At the tear strip 9 the overlapping edges 27 and 4 are separated by a quantity of melted tin 23 which hermetically seals the space between the overlapping edge 27 and the overlapping edge 4 at the tear strip 9. There is substantially no fusion of base metal 36 of the blank 25. This metal is for instance steel. This steel can be tin coated on both sides.

Depending on the quanity and quality of the tin coating 5, it could be necessary to apply an additional small amount of solder material or tin at the tear strip 9 between the overlapping edges 3 or 27, and 4. This solder material has in principal the function of forming a hermetic seal between the overlapping edges at the tear strip 9, without forming a rather strong link between the overlapping edges. In addition to tin, silver, lead and/or alloys thereof can be used.

Figure 7:
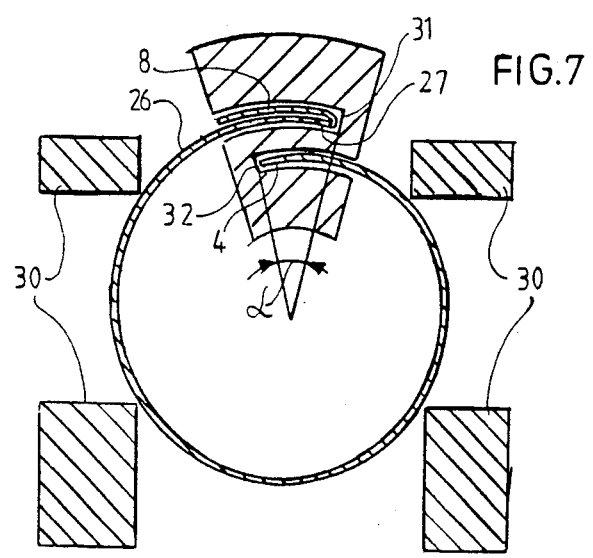
FIG. 7 is a transverse sectional view taken along the line VII—VII of FIG. 6.

In FIG. 9 it is shown that the edge 27 is folded or bent backwardly, so that the rolls 11 and 12 move over a continuous plane in comparison with FIG. 7 and do not "jump" at a stepwise change between the plate 25 and the tongue 8. The fold 40, having a width of about several mm, is provided with knicks or cuts 41 which start the scoring of the opening tear strip or score tap 9.

Figure 10:
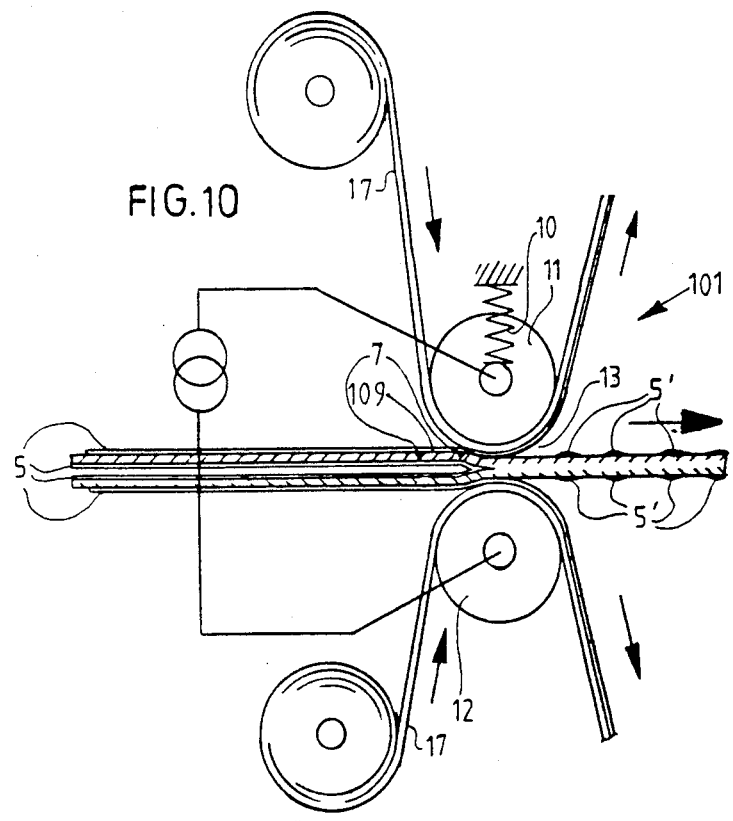
FIGS. 10 and 11 are schematic sectional views similar to FIG. 2 before and after the interruption of the welding operation at the opening tear strip, respectively.
Figure 11:
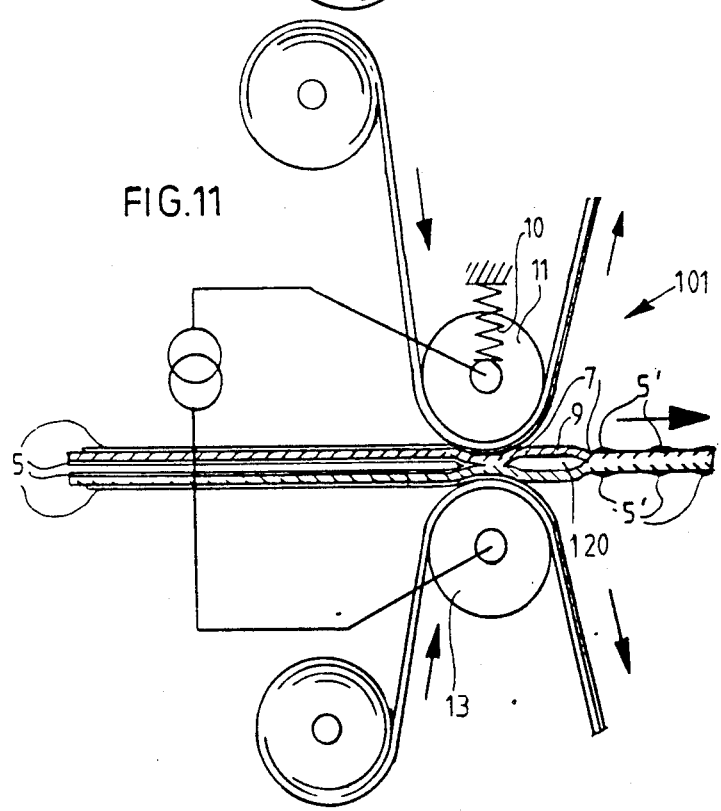

In combination with FIG. 1, in FIGS. 10 and 11 there is illustrated an apparatus 101 in which at a tear strip 109 the welding of the side seam is interrupted.

Using a signal derived from the feeler 19 a controlling unit (adjustable resistor) 15 incorporated in the current circuit 16 is controlled such that when the tear strip 9 passes through the nip 13, the electrical current transmission through the rolls 11 and 12 is blocked or greatly reduced. Thus, at the crossing of the tear strip 109 and the overlapping edges 3 and 4 no welding is effected, and as shown in FIG. 11, after the edges of the blank pass through the nip 13 a slot or void 120 remains between both edges at the tear strip 109.

If spot-welding as opposed to continuous welding is used, in which discrete intermitten electric currents are generated in the current circuit 16, the control unit 15 has for its function to interrupt during a period of time the intermittent current pulses, so that at the crossing of the tear strip 109 with the overlapping edges no welding operation occurs.

Figure 12:
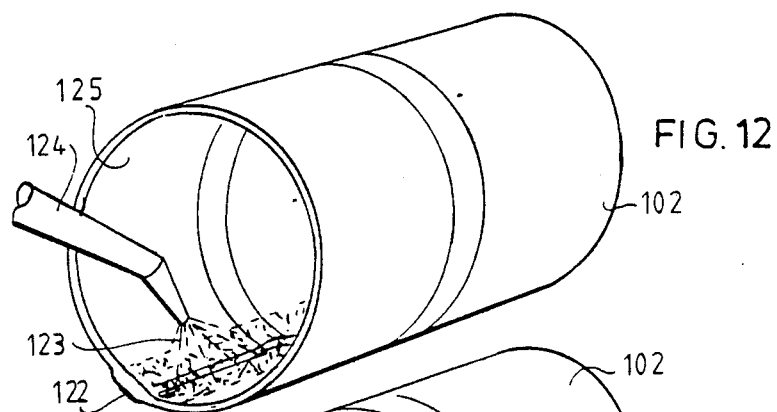
FIGS. 12 and 13 are schematic perspective views of apparatus for applying and forming the sealing material after welding with a gap according to the invention.
Figure 13:
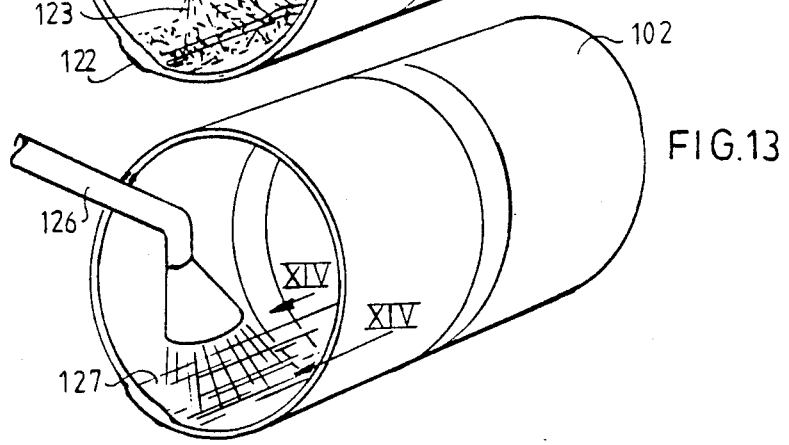
Figure 14:
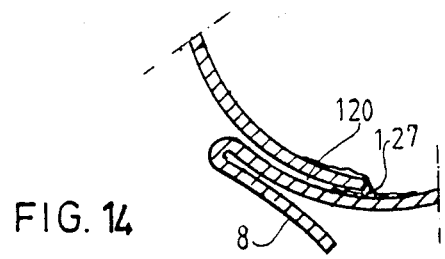
FIG. 14 is a transverse sectional view taken along the line XIV—XIV of FIG. 13.

After performing the welding operation, in which at the tear strip 109 the welding is interrupted, as shown in FIGS. 12-14, sealing material 123 is applied over the welded side seam 122 along the whole height of the body 102. For example, via a nozzle 124 powderous material 123 is applied at the internal side 125 over the whole welded side seam 122. Using a heat generator 126 the powderous material applied is subsequently melted, so that powderous material fuses forming a coating 127 covering the welded side seam 122, the slot 120 and the adjacent zone. Accordingly an open passage through the body 102 at the slot or void 120 is prevented. On the other hand, that material present at the welded side seam and/or at the overlapping edges of the blank from which the body 102 is formed, will be prevented from coming into contact with the contents to be contained in the body 102, so that inherent, undesired reactions (for example, meat discoloration) between the base metal of the body blank and the packaged product are avoided.

Any sealing material available in the art for covering a welded side seam, can be used, for instance a plastic based on epoxy or polyesters.

Although in the drawings a formed body is shown with a circle round cross section, it will be understood, that the present invention is also applicable to other types of bodies, with an unround, angular, square, rectangular, cross section, and the like.

We claim:

1. A method of forming a container body having an integral tear strip to facilitate opening of the container and wherein the container has a welded side seam, said method comprising the steps of providing a sheet metal blank formed of a base metal and having formed therein the tear strip, shaping the sheet metal blank to a tubular shape with remote edges of the blank in overlapping relation, progressively welding together said base metal in said overlapping edges from one end of the blank to the other with the welding of the base metal being interrupted at the tear strip, and sealing the side seam at the tear strip by means other than welding of said base metal, said sheet metal blank base metal being steel and having an overall coating formed of a metal having a melting temperature which is lower than the melting temperature of the base metal of the blank, the welding of the base metal being interrupted by reducing welding intensity to one wherein only melting of the coating will occur at the tear strip along the side seam, and the melted coating forming the means other than welding of said base metal which seals the side seam at the tear strip.

2. A method according to claim 1 wherein the welding of the base metal is interrupted by decreasing intensity of welding current.

3. A method of forming a container body having an integral tear strip to facilitate opening of the container and wherein the container has a welded side seam, said method comprising the steps of providing a sheet metal blank formed of a base metal and having formed therein the tear strip, shaping the sheet metal blank to a tubular shape with remote edges of the blank in overlapping relation, progressively welding together said base metal in said overlapping edges from one end of the blank to the other with the welding of the base metal being interrupted at the tear strip, and sealing the side seam at the tear strip by means other than welding of said base metal, the welding of the base metal being interrupted by increasing electrical resistance in the side seam in alignment with the tear strip, the electrical resistance being increased by providing the base metal of at least one of the overlapping edges in alignment with the tear strip with a layer of material which has a low electrical conductivity prior to welding.

4. A method of forming a container body having an integral tear strip to facilitate opening of the container and wherein the container has a welded side seam, said method comprising the steps of providing a sheet metal blank formed of a base metal and having formed therein the tear strip, shaping the sheet metal blank to a tubular shape with remote edges of the blank in overlapping relation, progressively welding together said base metal in said overlapping edges from one end of the blank to the other with the welding of the base metal being interrupted at the tear strip, and sealing the side seam at the tear strip by means other than welding of said base metal, the welding of the base metal being interrupted by increasing electrical resistance in the side seam in alignment with the tear strip, the electrical resistance being increased by increasing the thickness of the material to be welded.

5. A method according to claim 4 wherein the tear strip has a tongue which extends beyond an edge of the sheet metal blank, and the increase in thickness of the material to be welded is effected by bending the tongue back over the tear strip.

6. A metal container body having a circumferential tear strip spaced from ends of said body for facilitating opening of a resultant container, said body being primarily formed of a base metal and having a welded side seam formed by welded portions of said base metal, and said welded base metal side seam being interrupted in alignment with said tear strip, said side seam in alignment with said tear strip being sealed by means other than said welded base metal side seam, said body base metal being sheet steel having an overall surface coating of a metal having a melting temperature lower than the melting temperature of steel, and said tear strip has overlapped end portions rupturably joined together only by fusing of said coating metal during the welding.

7. A metal container body having a circumferential tear strip spaced from ends of said body for facilitating opening of a resultant container, said body being primarily formed of a base metal and having a welded side seam formed by welded portions of said base metal, and said welded base metal side seam being interrupted in alignment with said tear strip, said side seam in alignment with said tear strip being sealed by means other than said welded base metal side seam, a tongue forming an extension of said tear strip, and said tongue being folded back upon said tear strip with a portion of said tongue being incorporated in said side seam where said welding of said base metal is interrupted.

* * * * *